A. L. CLARK.
TRUCK.
APPLICATION FILED JUNE 22, 1908.
921,799.
Patented May 18, 1909.
3 SHEETS—SHEET 3.
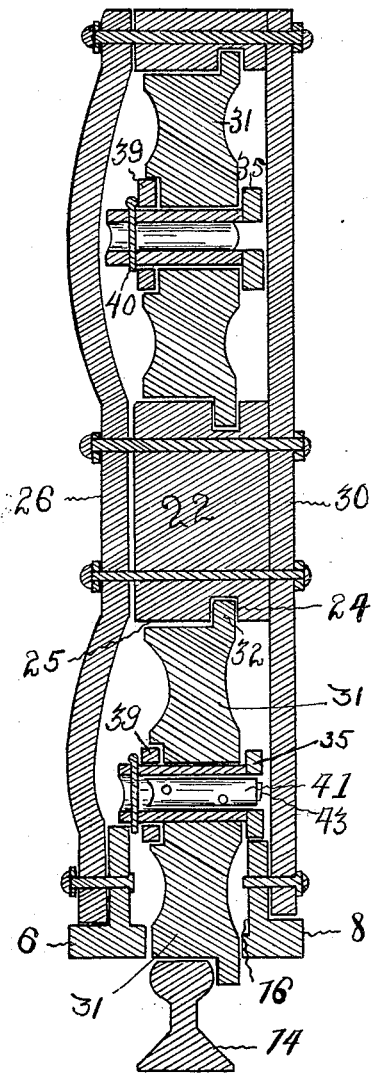
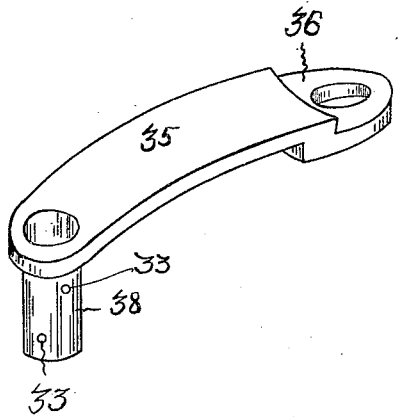
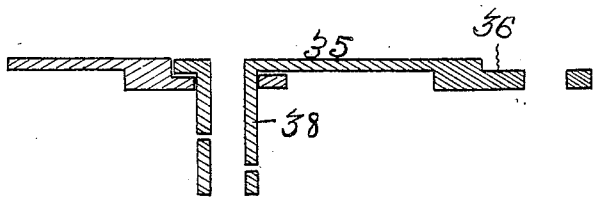
WITNESSES:
W. F. Ernsdorff
A. E. McEwell
INVENTOR.
Alfred L. Clark
BY
M. M. Cady
ATTORNEY.
THE NORRIS PETERS CO., WASHINGTON, D. C.

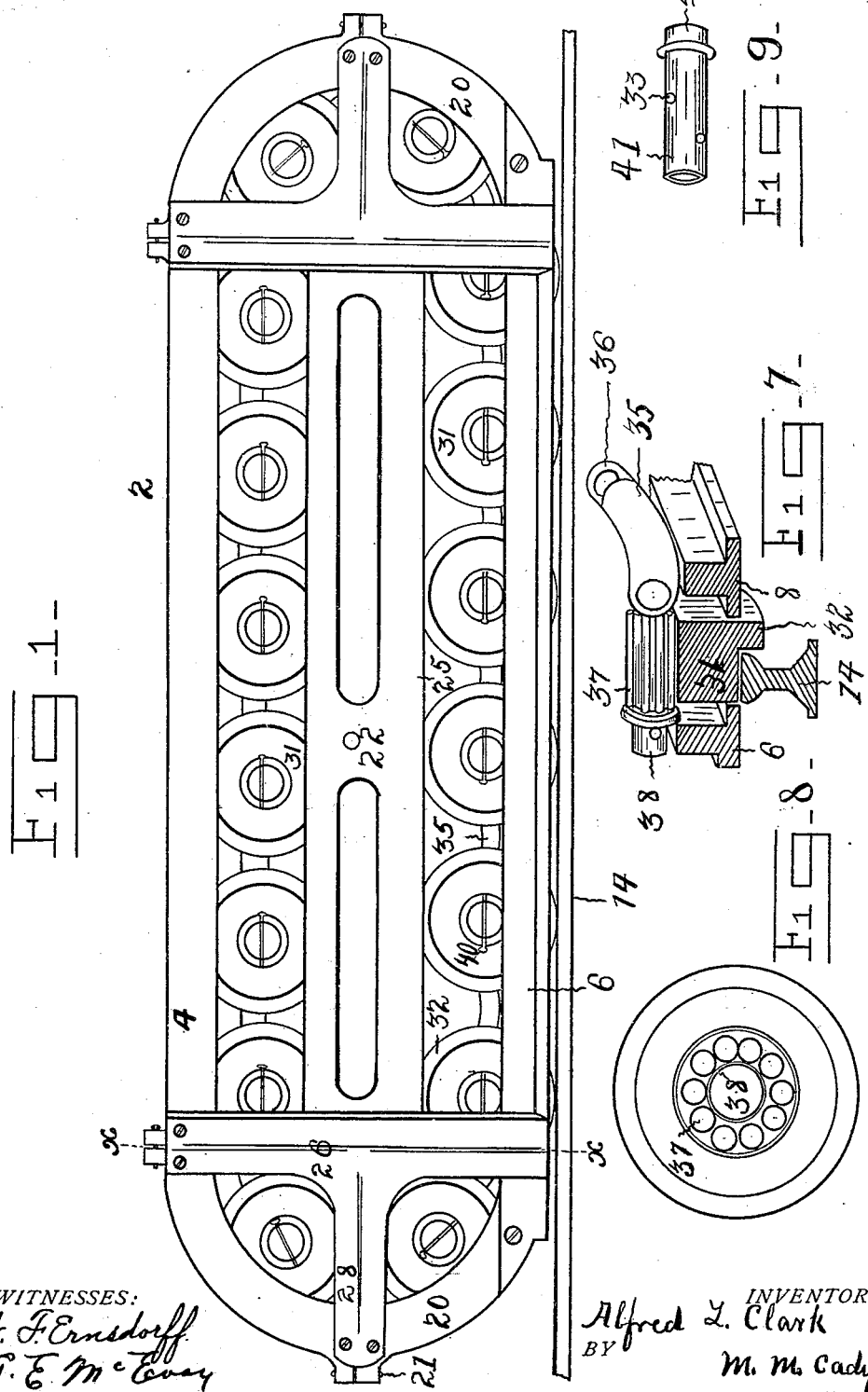

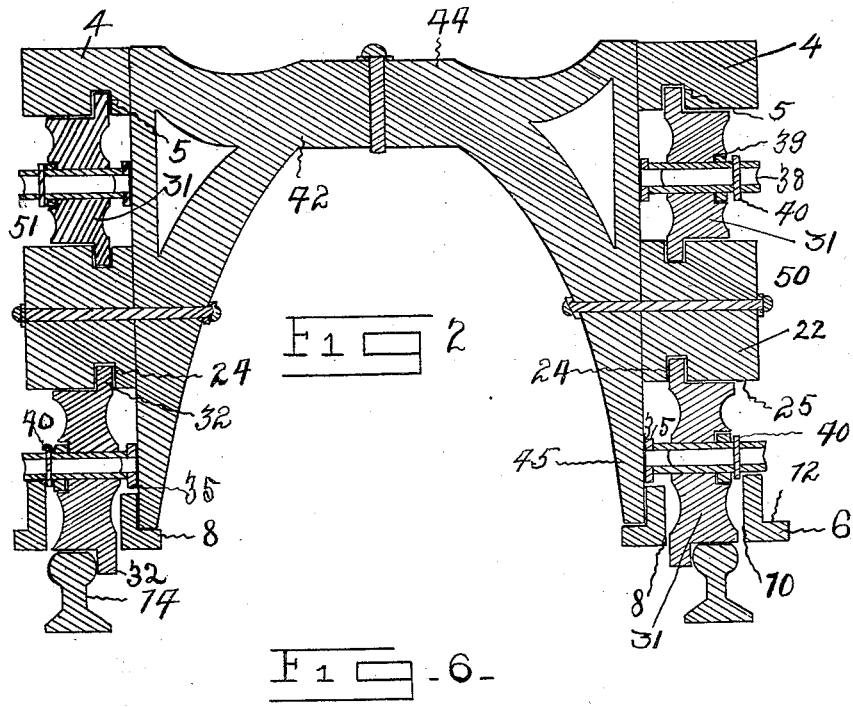
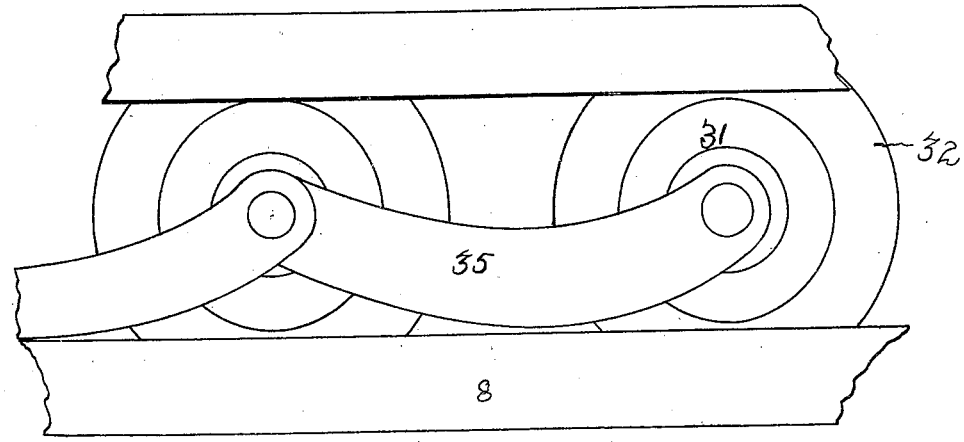

UNITED STATES PATENT OFFICE.

ALFRED L. CLARK, OF DUBUQUE, IOWA.

TRUCK.

No. 921,799.  Specification of Letters Patent.  Patented May 18, 1909.

Application filed June 22, 1908. Serial No. 439,791.

*To all whom it may concern:*

Be it known that I, ALFRED L. CLARK, a citizen of the United States, residing at Dubuque, in the county of Dubuque and State of Iowa, have invented a new and useful Truck, of which the following is a specification.

My invention relates to improvements in car trucks with special reference to the truck set out in my application for a patent on trucks, filed January 30, 1907, Serial No. 354,906, and is an improvement thereon, whereby the travel of the wheels is controlled and the danger from accidents is reduced to the minimum.

In what it consists, its manner of construction and its mode of operation, will be fully set out in the following specification and drawings accompanying the same and forming a part hereof.

Figure 1 is a side view of the truck. Fig. 2 is a cross section through the center of the truck. Fig. 3 is a cross section through line *x x* of Fig. 1. Fig. 4 is a perspective view of one of the links removed. Fig. 5 is a longitudinal section of Fig. 4. Fig. 6 is a side view of two wheels with the links attached. Fig. 7 is a part section and part perspective view of a detail. Fig. 8 is an end view of one of the wheels with the washer removed showing the ends of the roller bearings. Fig. 9 is a perspective view of the oiling device.

Like characters of reference denote corresponding parts in each of the drawings.

Referring to the drawings 2 designates the frame which consists of a bar 4 provided with a longitudinal guideway 5 in which the flanges of the wheels hereinafter to be described, travel. The base of the frame is composed of two longitudinal guide-bars 6 and 8. The bar 6 is of angle bar shape and has its inner side 10 nearly perpendicular and its outer side provided with a shoulder 12 and extends along the base of the wheels, parallel with track 14 on which the wheels travel. The inner bar 8 is of substantially the same shape as the bar 6 only cut away for a short distance on the side 16 next to the wheels and is a trifle shorter for the purposes presently to appear. These two bars run parallel with each other, one on one side and the other on the opposite side, along the base of the wheels and parallel with the track 14 and travel with the truck. The bars, 4, 6, and 8, are connected together at their ends, by the curved plates 20, which are each provided with a guideway that is a continuation of, and in the same plane as the guideway 5 in the bar 4 and in which the flanges of the wheels travel. The curved plates 20 are each constructed in two sections or parts, each having a projection by which the two parts are bolted together by the bolt 21 at the outer end and the projections which are bolted to the guide-bar 6 at one end and to the bar 4 at the other end.

In the longitudinal center of the frame is a bed plate 22 rounded at both ends and provided with a guideway 24 entirely around the bed in which the flanges of the wheels travel. The lower face 25 of this bed rests on the periphery of the wheels while they are traveling on the track.

To the bars 4, and 6, and the bed plate 22, are rigidly fastened stays 26 each provided with an arm 28 which is rigidly secured to the curved plates 20. The bar 6 and the stays 26 with their arms 28 may all be cast integral with each other.

On the inside of the frame are stays 30 similar to the stays 26, each provided with an arm. These stays are rigidly fastened to the bars 4, 6, and bed plate 22, and their arms to the curved plate 20.

The wheels 31 are provided with the usual car wheel flanges 32. These wheels are set to travel in the frame with their flanges in the guideways as hereinbefore stated. The hubs of the wheels are connected together by links 35 which serve to prevent the wheels from coming in contact with each other and hold them always at the same given distance apart. The links are preferably slightly curved longitudinally. At one end is an offset 36 with an opening therethrough and at the other end is a tube 38 integral therewith and set at right angles to the body of the link and when coupled together the tube is inserted in an opening through the hub and secured by a washer 39 around the tube and a key 40 passing through the tube and engaging the washer. For the purpose of reducing the friction to the minimum there may be ball or roller bearings 37 between the tube 38 and the opening in the hub as shown in Figs. 7 and 8. These rollers 37 extend nearly the length of the tube 38, leaving only sufficient room for the key 40, or, instead, there may be a loose metal bushing about the tube 38 between that and the inner side of the hub.

If the heat caused by the friction of the tube with the hub be largely increased, then there may be screwed into the tube 38 a receptacle 41 having numerous holes therethrough, which contains lubricating oil and this receptacle may be closed by the cork 43 and in that case, there would be holes or openings 33 in the tube 38.

The two members, 50 and 51, constructed in the manner hereinbefore described and secured together, form my truck. The center brace beam 42 which connects the two members together is constructed in the form of an arch with the head 44 and with the bracing members 45 which are securely bolted to the bed plates 22 and near their lower ends to the guide rails 8. Upon the head 44 the body of the car or other burden rests. By this mode of construction, it will be observed that the opposite flanges of each wheel are always in engagement with the guideways in the bar 4 and bed-plate 22 except while the wheels are on the track and then the flanges of the wheels are in the guideways in the bed-plate 22 and the wheels while on the track are between the two guide-bars 6 and 8 so that it is impossible for any one of the wheels to leave the track without all of them together with the entire truck and if there be a broken rail and part of it entirely removed, the wheels will not drop down upon the ground but the ends of the tubes 38 will rest upon the upper surface of the guide-bar 6 and the links 35 on the guide-bar 8 so that the truck will travel over the railless space without injury. It will further be seen that with the flanges of the wheels in the guideways and the wheels traveling on the track between the guide-bars there is the least possible chance of any one wheel leaving the track without the entire truck.

Having now described my invention what I claim is:

1. In a device of the character described a frame, a plurality of wheels adapted to travel in the frame, and guide-bars attached to the base of the frame between which the wheels travel while on the track.

2. In a device of the character described, a frame provided with guide-ways therein, a plurality of wheels adapted to travel in the guideways, and a guide-rail attached to the frame on each side of the wheels along by the track on which the wheels travel.

3. In a device of the character described, a frame provided with guideways therein, a plurality of wheels with flanges thereon and the flanges adapted to travel in the guideways, and two parallel guide-bars attached to the frame between which the wheels travel while on the track.

4. In a device of the character described, a frame provided with guideways therein, a plurality of wheels linked together and adapted to travel in the guideways in the frame, and two guide-bars attached to the frame between which the wheels travel while on the track.

5. In a device of the character described, a frame provided with guideways therein, a central bed plate with guideways around the same, a plurality of wheels adapted to travel around said bed plate within the guideways, and guide-bars attached to the frame between which the wheels travel while on the track.

6. In a device of the character described, a frame having guide-ways therein, a plurality of wheels adapted to travel in the guideways, and a guide-bar secured to the frame outside of the wheels and extending along by the track on which the wheels travel and also nearly in contact with the under surface of the hubs of the wheels while the wheels are on the track.

7. In a device of the character described, a frame, a plurality of wheels linked together and adapted to travel in the frame, and a guide-bar attached to the frame outside of the wheels along close to the track on which the wheels travel and of the width to extend nearly to the under surface of the hubs of the wheels, and a second guide-bar attached to the frame inside of the wheels along close to the track and of a width to nearly reach the base of the links that link the wheels together.

8. In a device of the character described, a frame consisting of an upper bar provided with a guideway in its under surface, a central bed plate provided with a guideway around said plate, two guide rails at the base of the frame, in combination with a plurality of wheels provided with flanges adapted to travel around said central plate with their flanges in the guideways in the upper bar and central plate and between the guide-bars while traveling on a track.

9. In a device of the character described, a frame with guideways therein, a central bed plate with guideways therein, a plurality of wheels having flanges adapted to travel in the guideways in the frame and central bed-plate, links connected with the hubs of the wheels for holding the wheels a given distance apart, said links secured in the hubs by tubes connected with the links and passing through the hub and secured by a key near the end of the hub, and two guide-bars at the base of the frame between which the wheels travel while on the track.

10. In a device of the character described, a frame provided with guideways therein, a central bed plate with a guideway around said bed, a plurality of wheels each provided with a flange adapted to travel in both the guideway in the frame and central bed-plate, and guide-bars secured to the frame between which the wheels travel while upon the track.

11. In a device of the character described, a truck frame composed of a top bar provided with a guide-way therein, a curved plate attached to the opposite ends of the top bar and provided with a guideway set as a continuance in the same plane as the guideway in the top bar, a central bed plate provided with a guideway entirely around said bed and said guideway in the same plane as the guideway in said top bar and curved plates, a plurality of wheels linked together and provided with flanges adapted to travel in the guideways of the frame and bed-plate, and two parallel guide-bars attached to the frame between which the wheels travel while on the track.

12. In a device of the character described, a frame curved at the ends and provided with a guideway in the inner face, a central bed-plate with a guideway around the bed, a plurality of wheels linked together and provided with flanges adapted to travel with the opposite edges of the flanges in the guideway in the frame and in the guideway around the bed, and guide-bars secured to the curved ends of the frame and parallel with the track between which guide-bars the wheels travel while on the track with the flanges of the wheels in the guideway in the bed.

13. In a device of the character described, a frame provided with guideways therein, a central bed plate with a guideway around the same, two guide-bars attached to the frame and running parallel with each other and with the track on which the wheels travel and the base of the guide-bars in substantially the same horizontal plane as the upper surface of the track, and a plurality of wheels adapted to travel in the guideways in the frame and around the bed plate and between the guide-bars while the wheels are on the track.

ALFRED L. CLARK.

Witnesses:
M. M. CADY,
W. F. ERNSDORFF.